Oct. 3, 1967
R. M. SINGER
3,344,853
APPARATUS FOR CONDENSING AND CONTROLLING THE
RATE OF CONDENSATION OF AN ELECTRICALLY
CONDUCTING LIQUID
Filed Nov. 2, 1965
2 Sheets-Sheet 1
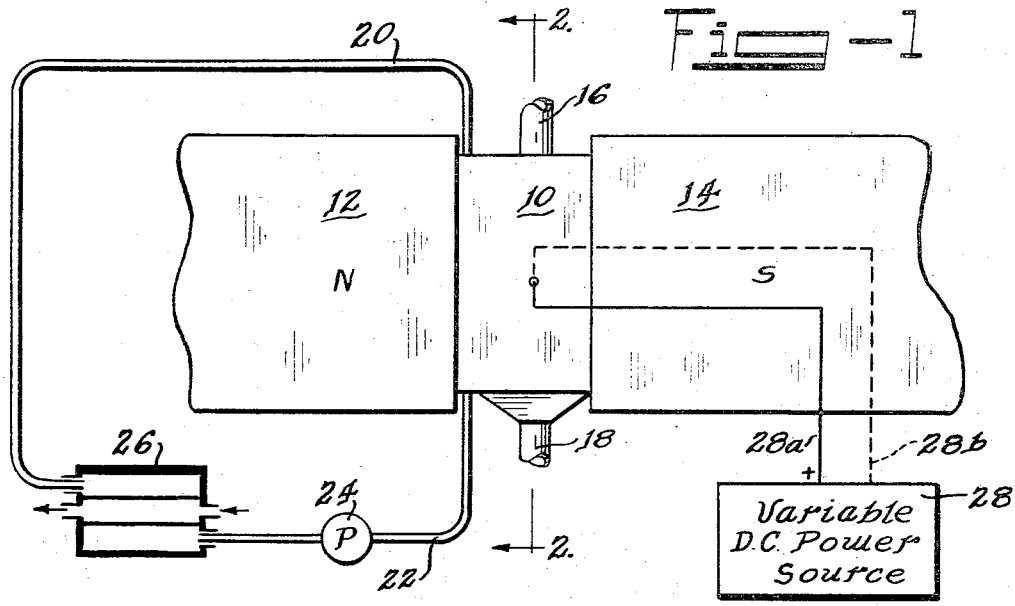
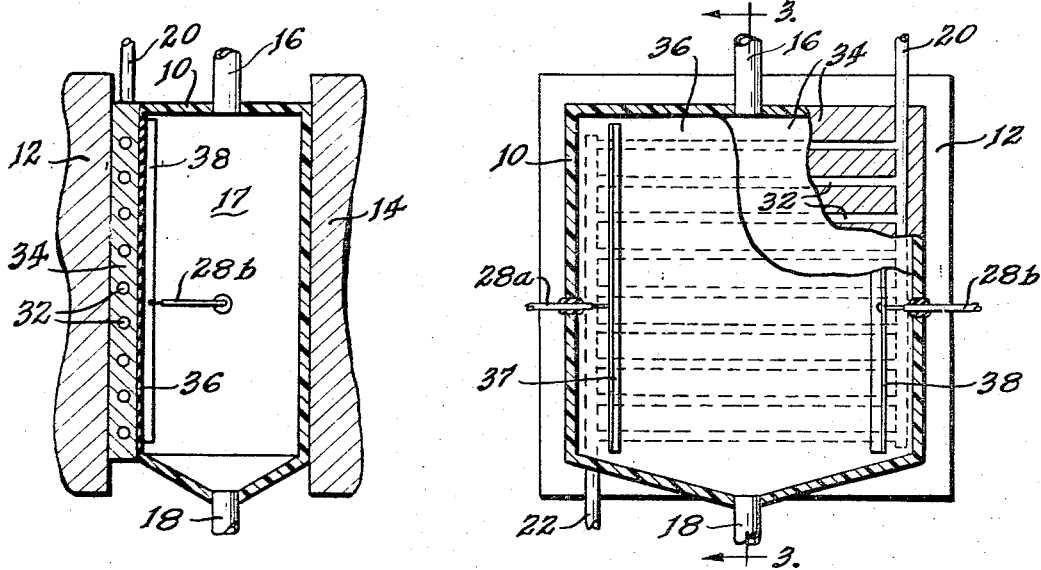
INVENTOR.
Ralph M. Singer
BY
Attorney INVENTOR.
Ralph M. Singer
BY
Attorney

United States Patent Office 3,344,853
Patented Oct. 3, 1967

3,344,853
APPARATUS FOR CONDENSING AND CONTROLLING THE RATE OF CONDENSATION OF AN ELECTRICALLY CONDUCTING LIQUID
Ralph M. Singer, Naperville, Ill., assignor to the United States of America as represented by the United States Atomic Energy Commission
Filed Nov. 2, 1965, Ser. No. 506,138
1 Claim. (Cl. 165—105)

ABSTRACT OF THE DISCLOSURE

A heat exchanger which condenses the vapor of an electrically conductive liquid within a chamber having a cooled electrically nonconductive wall capable of being wetted by said vapor. A magnet provides a D-C magnetic field normal to the wall and a D-C voltage supply is connected to apply a voltage to the condensate to induce a current therein and motion thereof in a particular direction.

---

The invention described herein was made in the course of, or under, a contract with the U.S. Atomic Energy Commission.

This invention relates to heat exchangers, and more particularly to heat exchangers for condensing the vapor of an electrically conducting liquid.

In a common type of heat exchanger in which the latent heat of a vapor is released as it condenses forming a film on a cooled surface, one of the factors limiting the rate of heat transfer per unit area of condensing surface is the thickness of the condensate film through which the heat released by condensation must flow before being conducted to the coolant. Ordinarily, the condensate is removed from the condensing surface in laminar flow under the force exerted by gravity. Therefore, with all the other system parameters fixed, the rate of heat transfer per unit area of condensing surface will increase if the condensate can be forced to move from the condensing surface faster than it otherwise would if left to the effects of gravity alone. Furthermore, such additional force applied to remove the condensate from the condensing surface may be capable of being controlled, and thereby itself control the rate of heat transfer per unit area of condensing surface. The present invention provides for the above advantages in those cases where the liquid condensate is an electrical conductor.

It is therefore an object of the preesnt invention to provide novel apparatus for condensing the vapor of an electrically conducting liquid.

A further object of the presen invention is to provide apparatus for controlling the rate of heat transfer in condensing the vapor of an electrically conducting liquid.

It is an even further object of the present invention to provide apparatus for increasing the heat transfer per unit area of a condensing surface in a heat exchanger in which the condensate is an electrically conducting liquid.

It is to be noted that if it is desired to operate the heat exchanger described above in a low-gravity or zero gravity environment, or if the condensing surface is confined to a horizontal plane so that gravity does not effect the removal of condensate from the condensing surface, some additional force would be needed to remove the condensate in order to make the system operable. This could be accomplished by simulating a gravity field (for example, by rotating the condensing surface and thereby forcing the flow of condensate under centrifugal force), but additional and complicated mechanical apparatus would be required.

It is, therefore, another object of the present invention to provide apparatus for establishing the direction of flow of an electrically conducting condensate off of a condensing surface, in which the system does not depend on gravity to remove the condensate.

It is still another object of the present invention to provide apparatus for removing an electrically conducting condensate from a condensing surface without the aid of gravity and without using additional moving parts in the system.

Briefly, the above objects are accomplished by coating one surface of a heat exchanger designed to condense a vapor whose liquid conducts electricity with a non-electrically conducting material. A magnetic field is then established perpendicular to the condensing surface, and an electrical current is forced through the condensate film parallel to the plane of the condensing surface, thereby inducing a force in the condensate and causing it to flow along the plane of the condensing surface. Analysis of the heat flow for such a system indicates that the heat transfer rate per unit area of condensing surface can be substantially increased over the conventional system in which the condensate flows only under the influence of gravity.

The nature and further objects of the invention will be better understood by tose skilled in the art from the following disclosure accompanied by the attached drawings in which:

FIG. 1 is a schematic representation of apparatus according to the present invention.

FIG. 2 is a sectional view, partly cut away, taken through the line 2—2 of FIG. 1.

FIG. 3 is a sectional view taken through line 3—3 of FIG. 2.

Figure 4:
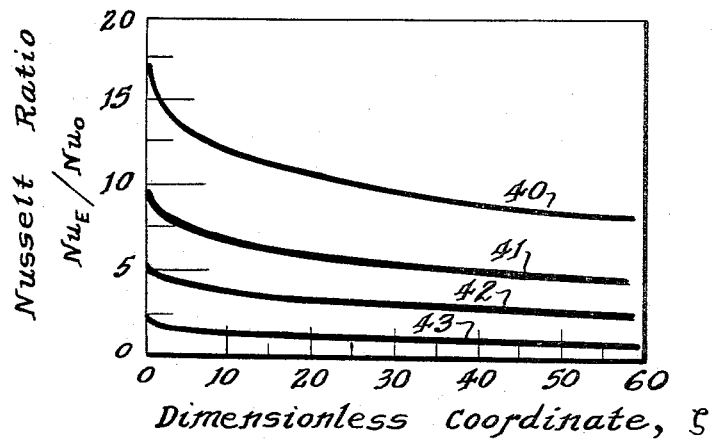
FIG. 4 is a graph of the ratio of Nusselt numbers against a dimensionless coordinate for various values of $\zeta$ which is defined in the disclosure.

In FIG. 1, a chamber 10 is located between a north magnetic pole 12 and a south magnetic pole 14. A pipe 16 is attached to the top of chamber 10 to allow vapor, indicated by numeral 17, into the chamber 10. A condensate outlet pipe 18 is attached to the bottom of the chamber 10. Pipes 20 and 22 are provided respectively at the top and bottom of the left side of chamber 10 for the flow of coolant. The coolant, of course, is isolated from the vapor 17 inside chamber 10 so that the two do not mix. A pump 24 is provided to circulate the coolant and force it through a second heat exchanger 26. Output leads 28a and 28b of a variable D-C power source 28 run through the side walls of chamber 10.

In FIGS. 2 and 3, chamber 10 is bounded on five sides by a heat insulating, non-electrically conducting material and on the condensing side 34 by a heat conducting material having horizontal channels 32 joining the coolant pipes 20 and 22 thereby allowing uniform distribution of the coolant through the condensing side 34. The internal surface of condensing side 34 of chamber 10 is coated with a very thin layer of non-electrically conducting material (for example, glass) which forms the condensing surface 36. The bottom of chamber 10 is formed into a funnel to allow collection of the condensate of vapor 17 before it is recirculated.

The leads 28a and 28b from power source 28 terminate respectively on metal electrodes 37 and 38 located on the condensing surface 36 inside chamber 10. The electrodes 37 and 38 have an L-shaped cross section and extend vertically along opposite sides of the condensing surface 36 so as to face each other (FIG. 3). The electrodes 37 and 38 are electrically isolated from each other except when a continuous film of condensate lies between them, as explained below. The function of the thin layer of non-electrically conducting material forming condensing surface 36 is to electrically isolate the condensate film from the material through which the coolant flows. Thus the condensate film is not short circuited by an electrical conductor and current will be forced to flow through the film.

Vapor 17 enters the chamber 10 through pipe 16 and condenses on condensing surface 36 thereby releasing its latent heat of vaporization which is carried off ultimately by the contained coolant flowing through the channels 32. The particular combination of conducting liquid and material of condensing surface 36 which are selected must be chosen such that a continuous film of condensate is formed across the condensing surface 36 for reasons to be explained below.

When a potential difference is placed across electrodes 37 and 38, and a condensate film has built up on condensing surface 36 causing a continuous conducting path to exist between electrodes 37 and 38, current will flow between the electrodes 37 and 38 through the continuous condensate film. Since the flow of current is normal to the direction of the magnetic field established between pole 12 and pole 14, a force will be exerted on the condensate in the plane of the condensing surface 36 according to the well-known Fleming's left hand rule for motors. For the direction of current shown in FIG. 1, that is current flowing from electrode 37 to electrode 38, the force exerted on the condensate will be downward. I have found, by analyzing the heat-transfer rates for a system using an electromagnetic field as described, that the rate of condensation per unit area of condensing surface, and consequently the total heat transfer, can be significantly increased with respect to a similar system operating under gravity alone. As a practical matter, the electromagnetic field accelerates the condensate increasing its flow from the condensing surface and thus decreasing the thickness of the condensate film through which heat must flow before being conducted to the circulating coolant.

Besides the significant increase in heat transfer per unit area of condensing surface, it will be shown that the condensation rate may be adjusted or controlled by a simple adjustment of the output voltage of the electrical power supply or the intensity of the magnetic field. This is certainly a relatively simple manner in which to control an otherwise complex mechanism. Further, it will be noted that the embodiment described could be operated, with slight modification, either in a low-gravity or zero gravity field or in situations in which the condensing surface is confined to a horizontal plane where there would be no natural flow of condensate. Operation in space is feasible since the incoming vapor is pressurized to begin with and this pressure would force the condensate that had collected at the bottom of the condensing surface 36 (FIG. 2) back through the heat source (not shown). This eliminates the need for mechanical devices such as rotating discs or cylinders to simulate a gravity field.

As mentioned before, I have performed an extensive analytical study on the subject of condensation of a vapor whose liquid is an electrical conductor in the presence of an electromagnetic field, including a digital computer solution of the complex equation for film thickness. The analysis was presented and released for general publication at the Winter Annual Meeting of the American Society of Mechanical Engineers at New York, New York, November 29–Dec. 4, 1964. The results will be briefly presented here to gain a better insight into the merit of my invention and the pertinent relationships that affect heat transfer and system efficiency.

The Nusselt number, which is defined as $qx/k\Delta T$ (where $q$ is the heat flux, $k$ is the thermal conductivity of the liquid condensate, $x$ is the vertical position from the top of the condensing surface 36, and $\Delta T$ is the temperature difference between the liquid/vapor interface and the condensing surface), may be looked upon as a quantity representative of relative value of condensation systems. In other words, if one system has a larger Nusselt number than another, generally that system has a greater heat transfer per unit area of condensing surface than the second. The curves 40, 41, 42 and 43 of FIG. 4 are plots of the ratio of the Nusselt number for a system using only an electromagnetic field ($Nu_E$) to the Nusselt number for a similar system using only gravitational acceleration ($Nu_0$) against a dimensionless coordinate ($\zeta$) which represents the location along the condensing surface in the direction of condensate flow, but in dimensionless form. FIG. 4 shows this relationship in the family of curves, 40, 41, 42 and 43 for various values of the factor $\epsilon = g(p-p_v)/\sigma B_0 E_0$ where:

$g$ = gravitational acceleration
$p, p_v$ = density of liquid, vapor
$\sigma$ = electrical conductivity of condensate
$B_0$ = strength of applied magnetic field
$E_0$ = applied electric field intensity.

In curve 40, $\epsilon = 1 \times 10^{-5}$; in curve 41, $\epsilon = 1 \times 10^{-4}$; in curve 42, $\epsilon = 1 \times 10^{-3}$; and in curve 43, $\epsilon = 5 \times 10^{-2}$.

The factor $\epsilon$ is a dimensionless quantity representative of the ratio of the gravitational body force to the electromagnetic body force on the condensate. The curves, 40, 41, 42 and 43 of FIG. 4 are derived with the following relationships as indicated: $c\Delta T/h_{fg} = 0.001$; $\mu c./k = 0.003$; $(E_0/B_0)^2/h_{fg} = 0.010$; where:

$c$ = specific heat of condensate
$h_{fg}$ = latent heat of condensation
$\mu$ = dynamic viscosity of condensate
$k$ = thermal conductivity of condensate.

The quantity $c\Delta T/h_{fg}$ is recognized as the ratio of sensible to latent heat, and it essentially defines the load on the coolant or the amount of heat that must be carried away by the coolant. It will be noted from FIG. 4, which was calculated with sodium as the condensing vapor, that for an increase in the electromagnetic field strength (that is, smaller $\epsilon$) the Nusselt number ratio improves for all values of $\zeta$. For example, curve 42, for which $\epsilon = 1 \times 10^{-3}$, shows the Nusselt number for a heat exchanger system using an electromagnetic field is about three times greater than the Nusselt number for a system operating in gravity without using an electromagnetic field. The quantity $Nu_0$ is a constant in FIG. 4.

The curves 40, 41, 42, 43 of FIG. 4 also illustrate the capability of controlling the heat transfer rate for a given system by controlling the applied electromagnetic field. As the strength of the electromagnetic field increases (smaller $\epsilon$), the Nusselt number increases which indicates that the heat transfer also increases. Thus with the relatively simple manipulation of controlling the strength of the applied electromagnetic field, the heat transfer of the system can be regulated without changing the coolant flow rate or the vapor pressure. Although only the electric field of the preferred embodiment described above is shown as variable, it will be noted from FIG. 4 that it is really the combination of electric and magnetic fields that determines the amount of force induced in the fluid. Consequently, the magnetic field may be made adjustable by having the magnets 12 and 14 be electromagnets rather than permanent magnets thereby allowing adjustment of the magnetic field strength.

Figure 5:
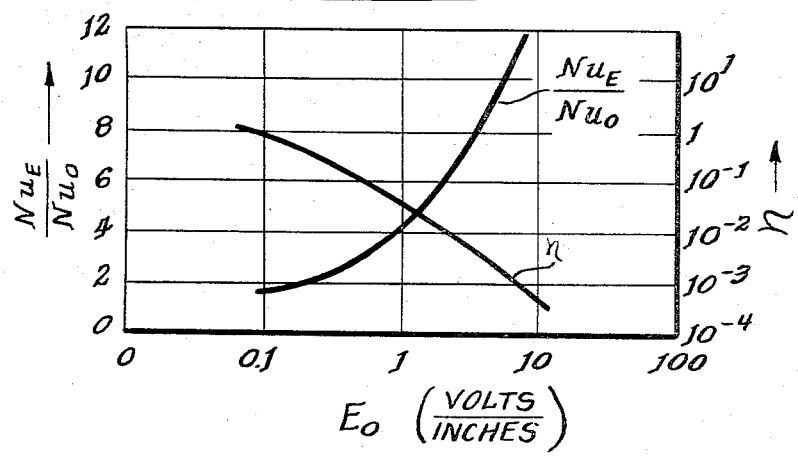
FIG. 5 is a graph showing curves of efficiency and the Nusselt number ratio, respectively, plotted against the applied electric field intensity.

The results of calculations for a specific system using sodium are illustrated in the graph of FIG. 5 in which both the ratio of Nusselt numbers as defined above and the system efficiency, $\eta$, are plotted against the applied electric field intensity, $E_0$. Efficiency, $\eta$ is defined as the increase in heat flux attributable solely to the application of the electromagnetic field divided by the total input power of the DC power source. It shows the effect of Joule ($i^2R$) heating in the condensate. In this case, the input power required to produce a magnetic field is assumed to be zero since permanent or superconducting magnets could be used.

The calculations for FIG. 5 were carried out with $c\Delta T/h_{fg}=0.001$. Further, the dimensions of the condensing surface are assumed to be one foot by one foot; the fluid properties of sodium at one atmosphere of pressure and 1630° F. (with Prantl number of approximately 0.003) are used; and it is assumed that the strength of the applied magnetic field is constant at 20 kilogauss.

The ordinate shown on the left hand side of FIG. 5 is the Nusselt number ratio, and it can be seen that a substantial increase in the Nusselt number ratio is obtained as the applied electric field intensity is increased. The right hand ordinate of FIG. 5 is efficiency, $\eta$, as defined above, on a logarithmic scale. The efficiency falls off substantially as the applied electric field intensity is increased. However, an example will serve to illustrate the effectiveness of the present invention at the lower applied electric fields. With an applied electric field intensity of approximately 0.30 volt per inch of condensing surface width (that is, total applied voltage of 3.6 volts), the system using an electromagnetic field without gravity transfers approximately 250% greater heat than a system using gravity alone; the efficiency, as defined above, being about 50%. It is to be noted that the effect on heat transfer due to gravity and that due to the application of an electromagnetic field are, for all practical purposes, cumulative. For a maximum utilization of energy a minimum value of applied voltage ($E_o$) should be chosen consistent with the heat transfer requirements in order to minimize the Joule heating.

FIG. 5 also illustrates that the heat transfer of the system can be controlled by changing the applied electric field only and without changing the applied magnetic field by showing the change in the Nusselt number ratio as a function of $E_o$.

Since the embodiment described above is susceptible of various modifications and alternative constructions, it is to be understood that I do not intend to limit the invention to the specific form disclosed, but intend to cover all modifications and equivalents falling within the spirit and scope of the invention as expressed in the appended claim.

The embodiments of the invention in which exclusive property or privilege is claimed are defined as follows:

A heat exchanger for condensing the vapor of an electrically conducting liquid comprising:

(1) a condensing chamber having a substantially planar and vertical surface of nonelectrically conducting material capable of being wetted by said vapor;

(2) means for forcing said vapor into said chamber;

(3) means for cooling the nonelectrically conducting surface of said chamber, whereby said vapor condenses, forming a continuous conducting film thereon;

(4) means for establishing a D-C magnetic field perpendicular to said condensing surface;

(5) metal electrodes placed in said chamber on either side of said condensing surface and extending substantially the vertical length thereof, said electrodes being electrically isolated from said chamber by said electrically conducting surface and being adapted to contact said condensate film;

(6) voltage-generating means; and (7) means for connecting the output of said voltage-generating means to said electrodes, thereby establishing a current in said condensate film and inducing a force in said condensate to accelerate it in the direction of gravity.

References Cited

UNITED STATES PATENTS

| | | | |
|---|---|---|---|
| 2,246,327 | 6/1941 | Slepian | 165—105 |
| 2,962,265 | 11/1960 | Van Luik | 165—1 X |
| 3,194,300 | 7/1965 | Friedman | 165—1 |

ROBERT A. O'LEARY, *Primary Examiner.*

M. A. ANTONAKAS, *Assistant Examiner.*